United States Patent
Franz

(10) Patent No.: US 7,218,757 B2
(45) Date of Patent: May 15, 2007

(54) METHOD AND DEVICE FOR DETECTING OBSTRUCTION IN IMAGE SENSOR SYSTEMS

(75) Inventor: Matthias Franz, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 878 days.

(21) Appl. No.: 10/346,789

(22) Filed: Jan. 16, 2003

(65) Prior Publication Data

US 2003/0165268 A1 Sep. 4, 2003

(30) Foreign Application Priority Data

Jan. 17, 2002 (DE) .............................. 102 01 523

(51) Int. Cl.
*G06K 9/00* (2006.01)

(52) U.S. Cl. ....................... 382/104; 382/141; 382/154

(58) Field of Classification Search ........ 382/103–104, 382/141–149, 154
See application file for complete search history.

(56) References Cited

U.S. PATENT DOCUMENTS

| 6,477,260 B1 * | 11/2002 | Shimomura ................. 382/106 |
| 6,617,564 B2 * | 9/2003 | Ockerse et al. .......... 250/208.1 |
| 6,801,244 B2 * | 10/2004 | Takeda et al. .............. 348/119 |
| 7,012,560 B2 * | 3/2006 | Braeuchle et al. ............ 342/70 |

* cited by examiner

*Primary Examiner*—Jingge Wu
*Assistant Examiner*—Tom Y. Lu
(74) *Attorney, Agent, or Firm*—Kenyon & Kenyon LLP

(57) ABSTRACT

A method and a device for the detection of obstruction in image sensor systems made up of at least two image sensors, which record essentially the same scene. If at least one image feature of the respective images differs unacceptably between the respective images, a signal is generated indicating the obstruction.

10 Claims, 1 Drawing Sheet

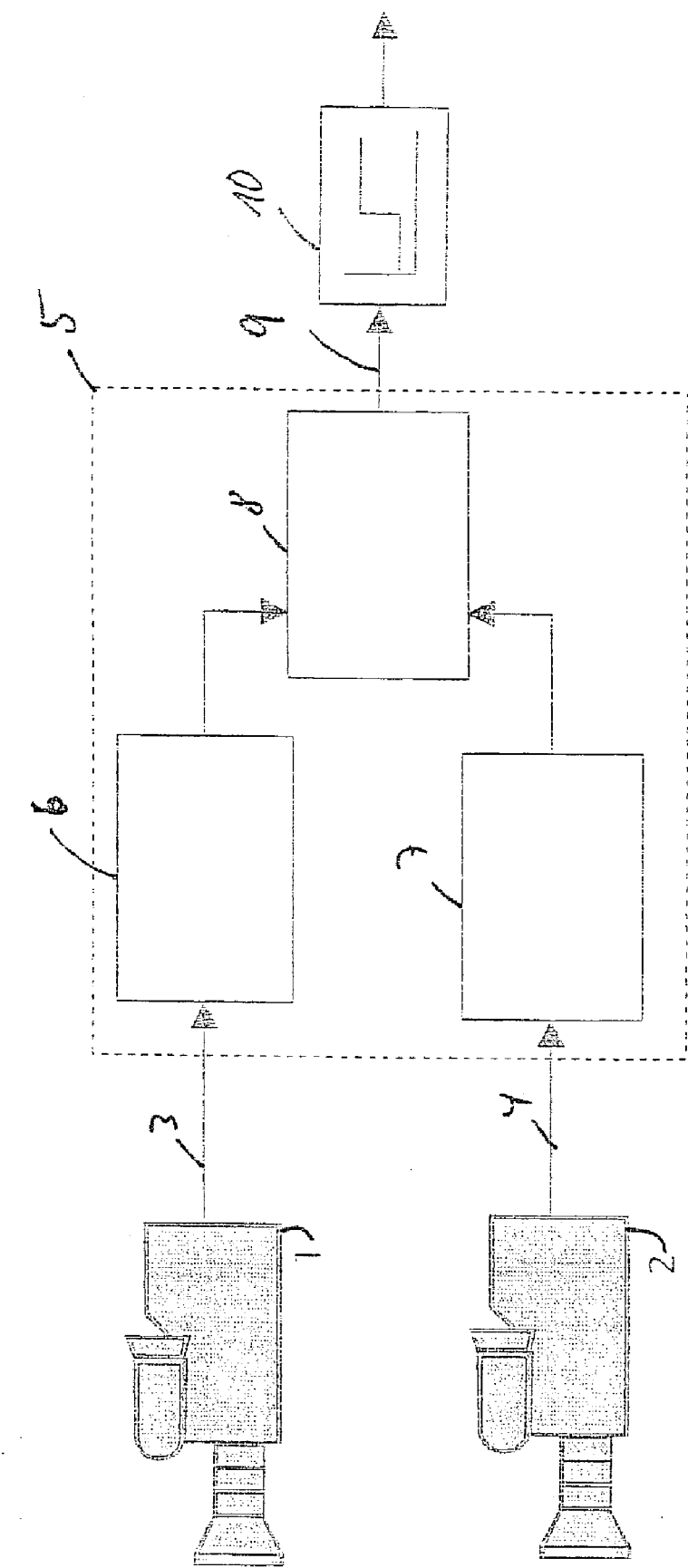

METHOD AND DEVICE FOR DETECTING OBSTRUCTION IN IMAGE SENSOR SYSTEMS

FIELD OF THE INVENTION

The present invention relates to a method and a device for detecting obstruction in image-processing-sensor systems including at least two image sensors.

BACKGROUND INFORMATION

Image sensor systems including at least two image sensors, which record essentially the same scene (so-called stereo camera systems), will be used in the future for object recognition, e.g. within the framework of a driver assistance system. Since the recorded images are evaluated in subsequent systems, the image sensor system has to provide for sure functioning and for ensuring the quality of the images, test its own performance reliability, react when faults appear, and especially inform subsequent systems evaluating the images on the manner of appearing, and possibly the type of the fault. One fault condition, which may impair the performance reliability of the image system or the quality of the images delivered, is the obstruction of the visual range of one of the image sensors by interfering objects. Such cases occur particularly in the field of motor vehicles when, for example, while it is raining, the windshield wiper runs briefly through the camera image or the windshield in front of a camera is dirty. Such an obstruction, for instance, has disturbing effects on a stereoscopic determination of distances to (from) objects.

SUMMARY OF THE INVENTION

Because of the formation of a signal indicating the obstruction of an image sensor in an image sensor system, when there are unacceptable differences in at least one characteristic feature in the images taken by the at least two image sensors, the obstruction of one of the image sensors is detected in an advantageous manner, and is passed on to subsequent systems, if necessary.

Therefore, in an advantageous manner, the latter systems may react suitably to such an obstruction message, for instance, by fading out the images affected by the obstruction, during a stereoscopic determination of object distances, and by doing without object detection.

In an advantageous manner, the obstruction is ascertained by measuring the image difference of at least two images of an image sensor system including at least two image sensors. In this context, while measuring the image difference, in an advantageous manner consideration is given to the differences that exist anyway between the images, on account of the different viewing angles of the image sensors. Thus, an abrupt increase of this difference is evaluated, particularly for measuring the image difference.

Thereby, in an advantageous manner, the image sensor is put in a position of checking an important aspect of its performance reliability itself, and of informing other systems if obstructing faults are present.

It has shown itself especially advantageous to measure the image difference directly on the basis of gray-scale values of the image, perhaps by determining the pixel differences or by calculating the correlation of the images, or with the aid of differences of secondary image features, such as the histogram of the gray-scale values.

The use of obstruction detection and obstruction reporting is advantageous not only in stereo camera systems in motor vehicles, but in all image sensor configurations in which two or more image sensors image the same scene, both within the field of motor vehicle technology and outside of it.

BRIEF DESCRIPTION OF THE DRAWING

The FIGURE shows an overview sketch of a stereo camera system having an evaluation unit designed to form a signal indicating the obstruction of one of the cameras.

DETAILED DESCRIPTION

FIG. 1 shows a general view of a stereo camera system having a first camera 1 and a second camera 2. Both cameras are positioned in such a way that they image the same scene, but at a slightly different viewing angle. Thus, both cameras ascertain images of the observed scene which they deliver via data lines 3 and 4 to an evaluation unit 5. Evaluation unit 5 is made up of several modules which, in the preferred exemplary embodiment, are designed as programs of a microprocessor or a plurality of microprocessors. For the detection of obstruction, each camera is provided with associated feature determining modules 6 and 7, respectively, which ascertain at least one typical feature of the delivered image in each case. A comparison module 8 compares this at least one feature of the two images. If there are unacceptable deviations, if, in particular, the difference existing anyhow changes abruptly or if the deviation exceeds a predefined threshold, a fault signal is generated which is passed on to subsequent systems via data line 9. In one exemplary embodiment, a delay element 10 is provided which generates a fault signal for other systems only when a certain number of comparing operations ascertain unacceptable differences between the two images, or if this result occurs with a certain frequency (in the evaluation of sudden changes, when the change remains present over a certain length of time).

Depending on the exemplary embodiment, primary or secondary image features are available as image features. An example of a primary image feature would be the comparison of the gray-scale values of individual pixels, a fault being detected when the difference in the gray-scale values in one or a predefined number of pixels changes abruptly, or when the difference exceeds a predefined threshold value. Furthermore, the image difference may be ascertained by the determination of the correlation function of the images, an obstruction fault being detected in the case of a missing correlation, i.e. a corresponding pattern of the correlation function. This situation is determined with the aid of the magnitude and/or the form of the correlation function. Secondary image features involve particularly the histograms of the gray-scale values of the two images, from which the fault signal is derived within the framework of the comparison operation, in the case of unacceptable differences.

In this context, for instance, an abrupt change in the center of gravity of the histogram or in its shape, or the subsequently described feature vectors are evaluated.

In the embodiment shown in the FIGURE the measurement of the image difference is performed via an extraction of image features. These image features are either the histograms of the gray-scale values of each respective image, or even a list of detected objects. The feature vectors obtained (list of the objects, list of the gray-scale frequency, etc.) are then compared to one another in the comparing module and characterized by a measure of the difference. This measure of the difference is, in the simplest case, a distance measure between the two feature vectors or the scalar product of the two vectors. If this measure of difference of both image vectors and feature vectors exceeds a predefined threshold value which takes into consideration the image differences because of the different visual angles of the image sensors, an obstruction is detected. This detection is passed on, in a suitable manner, to the subsequent systems by the use of the generated signals together with the images.

A typical situation in which obstruction is detected is the obstruction of one of the two cameras by a sufficiently large object. In this case, the image sensor system, or the image sensor system included in an overall system, signalizes a corresponding fault.

The procedure described is not limited to the use of image sensor systems made up of two image sensors in a motor vehicle. Rather, the procedure described, having the corresponding features, may also be used outside motor vehicle technology, and for systems having more than two cameras, in which the comparing of the images of each individual camera among one another is carried out. The assumption is only that the image sensors used record the same scene.

What is claimed is:

1. A method for the detection of an obstruction in an image sensor system, comprising:
   providing at least two image sensors, the at least two image sensors recording essentially the same scene; and
   generating a signal indicating an obstruction of only one of the image sensors if images generated by the two image sensors deviate unacceptably from one another in at least one feature.

2. The method according to claim 1, wherein the feature is a list of detected objects.

3. The method according to claim 1, wherein the feature is gray-scale values of individual pixels of each of the images.

4. The method according to claim 3, further comprising ascertaining image differences from the gray-scale values of the images by determining one of (a) pixel differences and (b) a correlation of the images.

5. The method according to claim 1, wherein the at least one feature includes image features represented as feature vectors which are compared to one another.

6. The method according to claim 1, further comprising:
   ascertaining a measure of a difference of the two images from the at least one feature ascertained; and
   comparing the measure of the difference to a predefined threshold, an obstruction being detected when the threshold is exceeded.

7. The method according to claim 1, further comprising detecting an unacceptable difference in the at least one feature if one existing difference changes in an abrupt manner.

8. A method for the detection of an obstruction in an image sensor system, comprising:
   providing at least two image sensors, the at least two image sensors recording essentially the same scene; and
   generating a signal indicating an obstruction of at least one of the image sensors if images generated by the image sensors deviate unacceptably from one another in at least one feature, wherein the feature is a histogram of gray-scale values of each of the images.

9. A device for the detection of an obstruction in an image sensor system having at least two image sensors which record essentially the same scene, the device comprising:
   an evaluation unit for evaluating images generated by the image sensors and for generating a signal indicating an obstruction of only one of the image sensors if at least one feature deviates unacceptably in the images of the two image sensors.

10. The device according to claim 9, wherein the image sensor system is a stereo camera system in a motor vehicle.

* * * * *